United States Patent Office 2,764,589
Patented Sept. 25, 1956

2,764,589

STABILIZATION OF HETEROCYCLIC NITROGEN COMPOUNDS

Paul S. Hudson and Warren L. Smith, Bartlesville, Okla., assignors to Phillips Petroleum Company, a corporation of Delaware No Drawing. Application August 6, 1952, Serial No. 303,003

3 Claims. (Cl. 260—290)

This invention pertains to the stabilization of vinyl-substituted heterocyclic nitrogen compounds. In one of its aspects the invention pertains to the stabilization of vinylpyridine compounds.

It is known that difficulties are encountered in the manufacture of vinylpyridine and other vinyl-substituted heterocyclic nitrogen compounds because of the tendency of these vinyl compounds to polymerize upon standing at room temperature and upon exposure to elevated temperatures. In the case of vinylpyridines the presence of polymer is particularly undesirable because vinylpyridine compounds are employed as monomers for use in polymerization reactions and the like. Hence in the preparation of vinylpyridine compounds the steps of distillation and storage have been matters of concern.

In accordance with this invention, for the purpose of overcoming difficulties, due to the fact that vinylpyridine compounds are highly susceptible to polymerization, it is proposed to add an inhibiting agent or stabilizer. We have discovered that readily polymerizable vinylpyridine compounds can be effectively stabilized against polymerization during distillation and storage by adding iodine thereto in small quantities. The invention accordingly concerns a method for treating polymerizable vinylpyridine compounds to stabilize such compounds at temperatures up to 400° F. as well as at room temperature and below. However the process of this invention is also applicable to other vinyl-substituted heterocyclic nitrogen compounds.

One group of polymerizable heterocyclic nitrogen compounds which can be stabilized in accordance with our invention is the mono- and di-vinylpyridines, with the vinyl group being present in any of the several positions in the pyridine nucleus. Alkyl groups can be present on the ring or on the alpha carbon atom of the vinyl group, but the number of carbon atoms in the combined alkyl groups should generally not be greater than 12. These alkyl groups are preferably methyl and ethyl groups. Substituents attached to carbon atoms in the ring can be selected from the group consisting of hydrogen, alkyl, vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 3-vinylpyridine; 4-vinylpyridine; 2,5-divinylpyridine; 2-methyl-5-vinylpyridine; 2-vinyl-5-ethyl-pyridine; 2,3,4,trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3 - dodecyl - 4,5 - divinylpyridine; 2,4-dimethyl-5,6-dipentyl-3-vinylpyridine; 2 - decyl - 5 - (alpha-methylvinyl) pyridine; 3,5-di(alpha-methylvinyl) pyridine; and the like.

Other polymerizable heterocylic nitrogen compound included within the scope of this invention are those vinyl and alpha-methylvinyl substituted heterocyclic nitrogen compounds in which the ring structure is unsaturated, partially saturated and completely saturated. Examples include vinyl and alpha-methylvinyl substituted quinolines, isoquinolines, piperidines (hexahydropyridines), pyrroles, pyrrolidines, pyrrolidones, especially the vinyl-substituted pyrrolidones, piperidines, pyrroles, pyrrolidines, quinolines, isoquinolines, and alkyl derivates of the foregoing compounds, dihydro and tetrahydropyridines, partially hydrogenated quinolines and isoquinolines, and pyrrolines (dihydropyrroles). Examples of such compounds are 2-vinylquinoline; 8-ethyl-2-vinylquinoline; 4-hexyl-5-vinylquinoline; 1-vinylisoquinoline; 5-methyl-1-isopropenylisoquinoline; 1,8 - divinylisoquinoline; vinylpyrrolidone; vinylpyrrole; vinylpiperidine; and vinylpyrrolidine and the like. Normally the vinyl substituent will be attached to a ring carbon atom. However in compounds wherein the ring nitrogen atom is a secondary nitrogen atom the vinyl group can instead be attached to this ring nitrogen atom, for example in N-vinylcarbazole and N-vinylpyrrolidone.

The process of this invention is particularly applicable to organic or hydrocarbon mixtures containing a substantial proportion of vinylpyridine compounds. Examples of vinylpyridine compounds contained in such mixtures are 2-vinyl-4,6-dimethylpyridine, 2 - methyl - 4 - vinylpyridine, 2-methyl-5-vinylpyridine, 5-ethyl-2-vinylpyridine, 5-amyl-2-vinylpyridine. These and long chain alkyl vinylpyridines can be prepared by treating alkylpyridines having a methyl group in the 2 or 4 position, i. e. a reactive methyl group, with an aldehyde which adds on to the methyl group. A molecule of water is then split off.

In carrying out the invention solution of the iodine in the vinylpyridine or other heterocyclic compound to be stabilized can be accomplished in any suitable manner such as by agitating or stirring the mixture with iodine or merely by permitting the mixture to stand. A mere trace, e. g. .0005 per cent by weight of dissolved iodine, is sufficient to inhibit polymerization of the vinylpyridine compounds, but in practice 0.001 to 5 per cent by weight will be employed. In general the amount will depend upon the heterocyclic compound being stabilized. We prefer an amount of iodine in the range of .001 to 1 per cent by weight, all percentages being based on the weight of the heterocyclic compound. Obviously larger amounts can be used, this limit being governed by economic considerations.

The following examples are illustrative of our invention, but are in no sense limitative thereof.

Example 1

Runs were made wherein sealed samples of 2-methyl-5-vinylpyridine containing 0.3 weight per cent of iodine were stored at a temperature of 185° F. for a period of 24 hours. An untreated control was included for comparison. At the end of the storage period the percentage polymerization was determined on each of the samples. Results are recorded in the following table.

| Iodine added, weight percent | Atmosphere | Temperature, °F. | Time | Percent Polymerization |
|---|---|---|---|---|
| 0.3 | Air | 185 | 24 | 1.56 |
| 0.3 | Nitrogen | 185 | 24 | 1.29 |
| 0.3 (vinyl-pyridine contained 5% water) | do | 185 | 24 | 2.53 |
| 0 (control) | do | 185 | 24 | 23.0 |

Example 2

A further series of runs was made to demonstrate the effectiveness of iodine as a stabilizing agent for 2-methyl-5-vinylpyridine in storage at room temperature (75° F.). Sealed samples of 2-methyl-5-vinylpyridine containing varying amounts of iodine were stored at 75° F. for 1 week and then the per cent polymerization was determined on each sample. Results are recorded below.

| Iodine added, weight percent | Atmosphere | Temperature, °F. | Time, weeks | Percent Polymerization |
|---|---|---|---|---|
| 0.01 | Air | 75 | 1 | None |
| 0.002 | Air | 75 | 1 | .1 |
| 0.001 | Air | 75 | 1 | None |
| 0 (control) | Air | 75 | 1 | 7.9 |

*Example 3*

To determine to some extent whether iodine would stay in a distillation column a simple test was conducted to compare the volatility of iodine with that of 2-methyl-5-vinylpyridine. In this example 2-methyl-5-vinylpyridine containing 1.8 per cent iodine was subjected to a distillation at 10 mm. mercury absolute pressure. Approximately 70 per cent of the vinylpyridine had been distilled overhead when iodine was first detected in the overhead product.

Thus in accordance with this invention organic mixtures containing vinylpyridine, i. e. vinylpyridines mixed with other organic or heterocyclic compounds, or purified vinylpyridines can be stored over long periods of time, preferably at room temperature. Likewise when it is desired to separate the vinylpyridine from the other organic compounds the stabilized solution can be distilled, preferably at reduced pressure without any substantial loss of product, the iodine serving to inhibit polymerization of the vinylpyridine compounds during the process. It will be understood that the foregoing disclosure is illustrative and that other embodiments within the scope of the invention will occur to those skilled in the art. Those skilled in the art will appreciate, for instance, that for the purposes of this invention, vinyl-substituted heterocyclic nitrogen compounds substituted with non-interfering groups for example halo-, nitro-, amino-, hydroxyl-, and carboxyl-, are the same as non-substituted vinyl heterocyclic nitrogen compounds.

We claim:

1. A method of stabilizing a polymerizable vinylpyridine compound against polymerization during storage and distillation by treating said compound with iodine in an amount from about 0.005 to about 5.0 per cent by weight based on the weight of the vinylpyridine compound being stabilized.

2. A method of stabilizing an alkyl-substituted vinylpyridine compound during storage and distillation by treating said compound with iodine in an amount from about 0.0005 to about 5.0 per cent by weight based on the weight of the compound being stabilized.

3. The process of claim 2 wherein the said alkyl-substituted vinylpyridine is 2-methyl-5-vinylpyridine.

References Cited in the file of this patent

UNITED STATES PATENTS

| 1,950,438 | Carothers et al. | Mar. 13, 1934 |
| 2,556,845 | Kauffman | June 12, 1951 |
| 2,607,775 | Vinton | Aug. 19, 1952 |
| 2,611,769 | Hays | Sept. 23, 1952 |
| 2,677,688 | Burrows | May 6, 1954 |

OTHER REFERENCES

Frank, JACS, vol. 68, page 908 (1946).

Berthelot, Bulletin de la societe chimique de France, vol. 6, 2nd series, pp. 294–96 (1866).

Carothers, High Polymers, vol. 1—collected papers of Wallace H. Carothers on Polymerization—edited by H. Mark and G. S. Whitby, pp. 113–20 (1940).